United States Patent [19]

Hensley

[11] 3,753,601

[45] Aug. 21, 1973

[54] FLUID ACTUATED BRAKE SAFETY DEVICE

[76] Inventor: James R. Hensley, 1325 Nutmeg, Escondido, Calif. 90240

[22] Filed: Aug. 9, 1971

[21] Appl. No.: 170,122

[52] U.S. Cl............................................... 303/84 A
[51] Int. Cl............................................ B60t 17/22
[58] Field of Search...................... 303/84 A, 84 R; 188/151 A; 200/82 D, 82 R

[56] References Cited
UNITED STATES PATENTS

| | | | |
|---|---|---|---|
| 3,141,302 | 7/1964 | Reese | 303/84 A |
| 3,309,966 | 3/1967 | Cornilland | 303/84 A |
| 3,382,333 | 5/1968 | Ihnacik | 303/84 A |
| 3,406,713 | 10/1968 | Borch | 303/84 A |
| 2,386,585 | 10/1945 | Blank | 303/84 A |
| 3,198,203 | 8/1965 | Margida | 303/84 A |
| 3,556,616 | 1/1971 | Hensley | 303/84 A |

FOREIGN PATENTS OR APPLICATIONS

| | | | |
|---|---|---|---|
| 574,519 | 3/1958 | Italy | 303/84 A |

Primary Examiner—Milton Buchler
Assistant Examiner—D. C. Butler
Attorney—William C. Babcock

[57] ABSTRACT

A safety device for use with two concurrently operable fluid actuated brake assemblies. The device is intermediately positioned between a master cylinder and the two brake assemblies. Upon a leak developing in one of the brake assemblies a valve member that forms a part of the safety device moves from a first to a second position to prevent further discharge of fluid to the defective brake assembly. The safety device allows the non-defective brake assembly to continue to operate in a normal manner.

Upon the valve member moving to a second position, an electrically operated warning light is illuminated to warn the driver of the vehicle on which the safety device is installed that one set of brake assemblies is inoperative. The safety device has two longitudinally spaced resilient O-rings associated with the valve member, with each O-ring serving both to effect a seal when the valve member moves to a second position, as well as to lock the valve member in this second position. A second form of the safety device utilizes a spring-loaded detent to hold the valve member in a second position.

7 Claims, 7 Drawing Figures

Patented Aug. 21, 1973
3,753,601
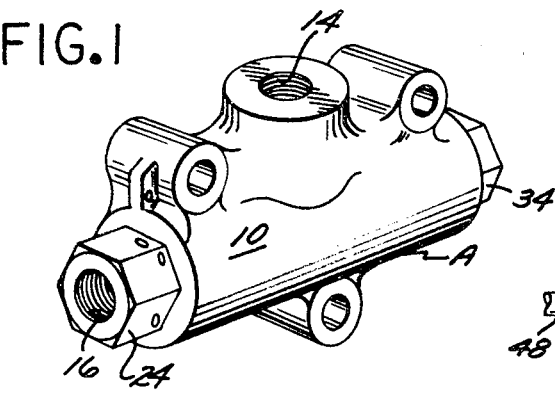
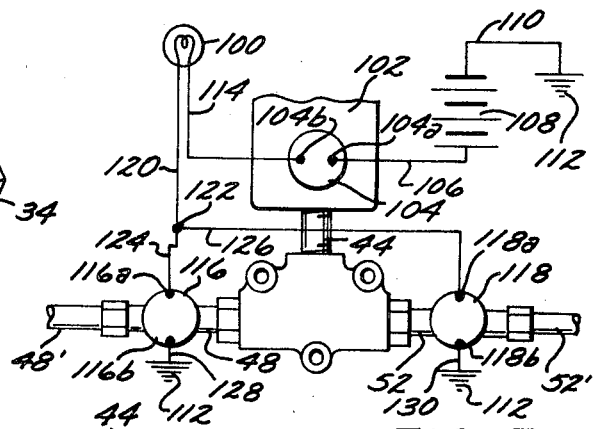
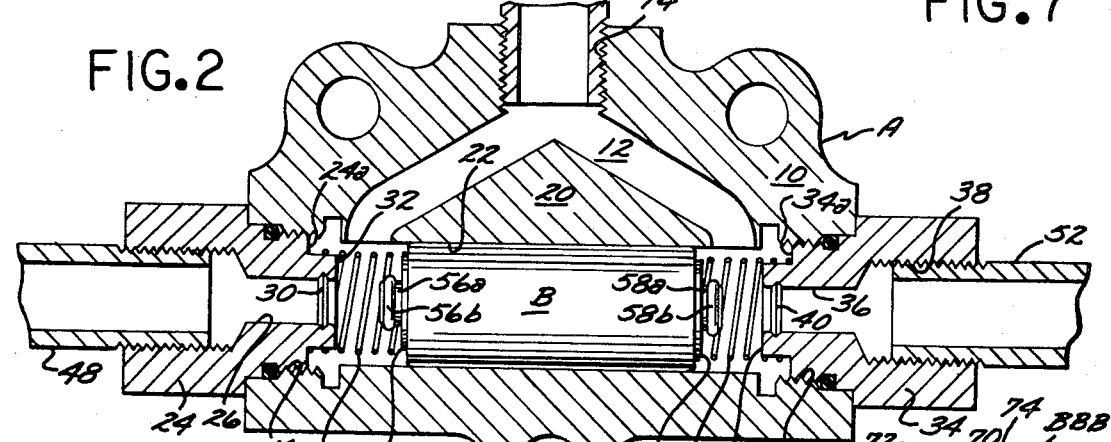
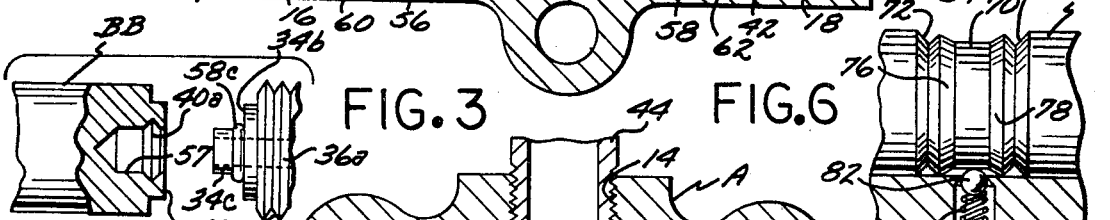
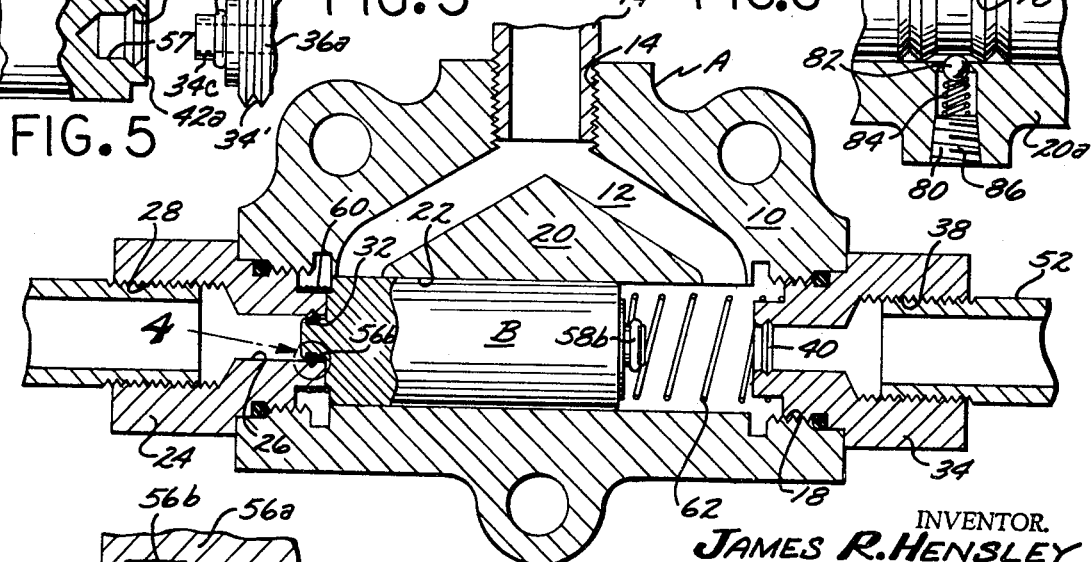
INVENTOR.
JAMES R. HENSLEY
BY
William G. Babcock
ATTORNEY 3,753,601

FLUID ACTUATED BRAKE SAFETY DEVICE

CROSS REFERENCE TO RELATED APPLICATION

The present application discloses an improvement of the device disclosed in my U.S. Pat. No. 3,556,616 that issued Jan. 19, 1971 entitled "Safety Device for Fluid Actuated Assemblies."

BACKGROUND OF THE INVENTION

1. Field of the Invention

An improved safety device for use with two concurrently operable fluid actuated assemblies, such as car and truck brakes, or the like, whereby the rendering inoperative of one assembly, caused by the development of a leak therein, does not also render inoperative the other assembly.

2. Description of the Prior Art

Safety devices of the present type have been used in the past to obstruct fluid communication between a master cylinder and one of two brake assemblies, when one of the brake assemblies or the conduit leading thereto develops a leak. The major operational disadvantage of such prior art safety devices is that the safety device blocks communication between the master cylinder and the defective brake assembly only during the time that the hydraulic liquid in the master cylinder is subjected to substantial pressure.

The primary purpose in devising the present invention is to supply a safety device that is of simple structure, inexpensive to produce and that overcomes the operational disadvantages of prior art devices of this nature.

SUMMARY OF THE INVENTION

A safety device that is intermediately positioned between a master cylinder and two brake assemblies that operate concurrently. Upon a leak developing in one of the assemblies, a valve member that forms a part of the assembly is moved from a first to a second position to prevent further flow of fluid to the defective brake assembly. Movement of the valve member results from a differential of hydraulic pressure within the device when the master cylinder is actuated. The valve member is operatively associated with two spaced resilient O-rings in such a manner that when the valve member moves to a second position, one of the O-rings not only seals with the valve member to prevent further flow of hydraulic liquid to the defective brake assembly, but also locks the valve member in a sealing position. In a second form of the safety device a spring-loaded detent serves to lock the valve member in a second sealing position.

A major object of the present invention is to provide an improved safety device whose valve member can be detent engaged in a fluid flow-obstructing position relative to either of two fluid outlets of the device and can also effect a fluid-tight seal of either of such fluid outlets.

Another object of the invention is to provide a safety device that includes a movable valve member and a pair of resilient O-rings that are so arranged that when a leak develops in either of two concurrently operated brake assemblies the valve member moves from a first to a second position, with one of the O-rings when the valve member is in the second position effecting a seal to prevent further discharge of hydraulic liquid to the defective brake assembly and also locking the valve member in said second position.

BRIEF DESCRIPTION OF THE DRAWINGS

FIG. 1 is a perspective view of a safety device which has been improved by the incorporation therein of the present invention;

FIGS. 2 and 3 are each longitudinal cross-sectional views, and showing respectively the valve member in a first intermediate position it normally occupies and a second locked position in which further flow of hydraulic liquid to a defective brake assembly is blocked;

FIG. 4 is an enlarged view of the portion of FIG. 3 that is encircled and identified by the numeral 4;

FIG. 5 is a view in partial section on the same scale as the view of FIG. 3, showing a first modification of the present invention;

FIG. 6 is a view in partial section on the same scale as the view of FIG. 3, showing a second modification of the present invention; and FIG. 7 is an electromechanical diagrammatic representation of an exemplary automotive system in which the safety device of the invention is utilized in conjunction with several pressure-operated electrical switches to provide an electric lamp indication of a fluid leak in the vehicle brake system.

DESCRIPTION OF EMBODIMENTS OF THE INVENTION

Referring now to FIGS. 1 to 3 inclusive, a safety device A of the present invention includes a multi-piece valve body 10 defining an interior confined space 12 that communicates with a tapped fluid inlet opening 14 and also with first and second axially, longitudinally aligned tapped openings 16 and 18 formed in the body.

The body 10 also includes an interior portion that is situated between openings 16 and 18. The portion 20 has a longitudinal bore 22 therein that is axially aligned with openings 16 and 18, both of which openings are tapped. First tapped opening 16 is engaged by a first threaded plug 24 in which a longitudinal threaded bore 28 and counter bore 26 are formed. An annular circumferential transverse groove 30 is formed in plug 24 and is in communication with counter bore 26. Groove 30 is preferably of V-shaped transverse cross section. The interior end portion of the first plug 24 defines a ring shaped valve seat 32, identified in FIG. 2, that on its inner edge merges into counter bore 26.

Second tapped opening 18 is engaged by a second threaded plug 34 in which a longitudinal counter bore 36 and threaded bore 38 are formed. An annular circumferential groove 40, similar to groove 30, is provided in second plug 34 and is in communication with counter bore 36. Groove 40 is preferably V-shaped in transverse section. The interior end portion of second plug 34 defines a valve seat 42. The valve seats 32 and 42 both are smooth annular surfaces. Fluid inlet opening 14 is engaged by a suitable threaded conduit 44 through which fluid, under pressure, is supplied to confined space 12. The outer end of first plug 24 is engaged by a conventional conduit 48 that leads to one of the pair of hydraulic brakes (not shown). Likewise, the outer end of second plug 34 is engaged by a conventional conduit 52 that is connected to the other of the pair of brakes (not shown).

An elongate, cylindrical valve member B is slideably mounted in bore 22. Member B has first and second end surfaces 56 and 58 from which first and second cylindrical portions or posts 56a and 58a of smaller transverse cross section extend outwardly in opposite directions. Each of the portions 56a and 58a carries an encircling resilient O-ring 56b and 58b.

First and second helical springs 60 and 62 are provided that are axially aligned with valve member B, with the springs being in abutting contact with opposite ends of the valve member and shoulders 24a and 34a formed on the plugs 24 and 34.

The springs 60 and 62 tend to at all times maintain valve member B at an intermediate position between valve seats 32 and 42 whereby hydraulic fluid in confined space 12 is free to flow through the bores and counterbores of plugs 24 and 34 to the conduits 48 and 52 to concurrently actuate the pair of brakes (not shown).

Should a leak develop in one of the conduits 48 or 52 or the brake assemblies (not shown) connected thereto, fluid entering space 12 via fitting 44 will flow out from the space 12 through the bores and counterbores of plugs 24 and 34 at different rates. This differential in rate of flow from confined space 12 creates a differential in pressure on the first and second end surfaces 56 and 58 of valve member B. The differential in pressure on the end surfaces 56 and 58 gives rise to a pressure force that causes valve member B to move from its normal or first position shown in FIG. 2 to one of two possible second positions. In FIG. 3 it will be seen that this differential in pressure has moved the valve member B to the left to a second position due to a leak having developed in conduit 48 or the brake assembly (not shown) associated therewith.

When the valve member B is so moved the annular surface 56 pressure contacts and abuts against valve seat 32, while the resilient O-ring 56b on the post 56a moves into the counterbore 26 of plug 24 to sealingly engage the annular groove 30.

The resilient O-ring 56b serves a dual purpose, as does the other resilient O-ring 58b, by reason of similar function, in that once it is lodged in the annular groove 30, after having been compressed during its travel along the counterbore 26, it decompresses, tending to resume its normal uncompressed shape so as to occupy the groove 30. In this way the resilient O-ring 56b affirmatively effects a detent engagement of the cylindrical portion or post 56a, hence of valve member B, with the plug 24 to hold the valve member B in a second position, as shown, against the compression force exerted by compressed spring 60 tending to return valve member B to the right to the first or intermediate position. At the same time, the ring 56b makes a fluid-tight joint or seal with plug 24 that enhances the sealing action provided by the pressure contact and abutment of the surfaces 56 and 32 of valve member B and plug 24. Due to the above-mentioned detent engagement effected the valve member B will remain in the fluid-obstructing second position shown in FIG. 3, after being moved thereto, and must be returned to the intermediate position shown in FIG. 2 upon repair of the leak that resulted in the movement of valve member B to one of its second positions.

Referring now to the partial view in FIG. 4 of that portion of FIG. 3 pointed to by the arrow leading from number 4 in FIG. 3, the valve member cylindrical portion or post 56a is shown. It has an unlabelled annular circumferential groove of U-shaped transverse section that contains resilient O-ring 56b fitted therein. Also shown in FIG. 4 is a portion of plug 24 having the groove 30. FIG. 4 shows portions of O-ring 56b, the plug 24 and the valve member B on an enlarged scale in their relative positions when the valve member B is disposed as shown in FIG. 3.

Should it be desired, it is possible to slightly alter the structure shown in FIG. 2 so that the O-rings 56b and 58b and cooperating detent grooves 30 and 40 of valve member B and plugs 24 and 34 are provided in a mechanical relation that is the reverse and that is illustrated in FIG. 5. In other words, the O-rings may be located on the plugs and the detent grooves may be located on the valve member. FIG. 5 illustrates a portion of a modified plug 34' facing a portion of a modified valve member BB, with the member BB shown in its intermediate or first position relative to the plug 34'. The plug 34' is threaded as shown, so that it can be screwed into the opening 18 of the valve body 10 and utilized in lieu of a plug having the construction of the earlier described plug 34. The plug 34' has an annular valve seat surface 34b, a concentric cylindrical post 34c, a resilient O-ring 58c fitted into a circumferential groove on the post 34c, and a passage including bore 36a, indicated by dashed lines, through which fluid may pass from the space 10 out of the safety device A. The modified valve member BB has an internal, single-ended recess 57 on each end that is in communication with an annular groove 40a and an annular end surface 42a. The groove 40a receives the O-ring 58c when the cylindrical post 34c is inside the bore of valve member BB and the valve seat surface 34b abuts the surface 42a, as happens on the occasion of the valve member BB being displaced from its first position to one of the second positions wherein the valve member BB obstructs the passage of the plug 34'. The action of the O-ring 58c in the groove 40a is, of course, similar to the comparable action described in the discussion of FIGS. 2 and 3 hereinabove so that the same results of hermetic sealing and detent engagement are obtained.

FIG. 6 illustrates a modification of the valve member and valve body structure illustrated in FIGS. 2 and 3 which may be utilized. The FIG. 6 structure shows a way to achieve detenting of a modified valve member BBB, only the central part of which is shown, the end parts being already described hereinabove. By use of this modification the utilization of springs 60 and 62, described earlier, if desired, may be dispensed with, as such springs are no longer necessary to keep the valve member BBB in its intermediate or first position. It is, however, possible to use both the springs 60 and 62 together with the modified structure depicted in FIG. 6 to good advantage.

In the modification illustrated in FIG. 6, the modified valve member BBB is provided with a cylindrical portion 70 of reduced diameter, located preferably midway between the ends of valve member BBB, situated between a pair of circumferential grooves 72 and 74 that are V-shaped. The portion 70 is bounded by conical circumferential walls 76 and 78. A modified body portion 20a is provided with a threaded bore 80 that ends at a circular opening in the body portion located near the cylindrical portion 70 of the valve member. A ball bearing 82 is held in the opening and bore 80 by a helical compression spring 84 and a threaded member 86 that is in threaded engagement with a tapped portion of bore 80. In this arrangement the ball bearing 82 normally projects through the associated opening of the valve body portion into the area between the grooves 72 and 74 to contact engage with the underlying area of portion 70.

When the force of sufficient value acts to push the valve member BBB in one or the other axial direction, as occurs upon the development of a differential between the pressures acting on the end surfaces of the valve member, as was earlier discussed, the ball bearing is pushed back toward the member 86, against the spring force of spring 84, by the conical portion 76 or 78, and is subsequently pushed by the spring 84 into either the groove 72 or 74. The lodging of the ball bearing in either groove 72 or 74 serves to detent the valve member in place in either of the two possible second positions. The displacement of valve member BBB from its intermediate position to a second position is such as to bring the valve member BBB into a location wherein obstruction of a fluid outlet passage of plug 24 or 34 is accomplished in the earlier described manner. An adjustment of the force required to move the ball bearing from position adjacent section 70 into a groove 72 or 74 can be made by turning the threaded member 84 in the threaded bore 86.

In FIG. 7 the safety device A is shown as installed in a vehicle (not shown) in such a manner that an incandescent bulb 100 is illuminated as a warning when a serious leak develops in the brake assembly. The bulb 100 is preferably located in an easily visible position on the dashboard (not shown) of the vehicle.

The master cylinder 102 of the vehicle has a normally open hydraulically operated pressure switch 104 connected to the interior thereof, with one terminal 104a of the switch being connected by a conductor 106 to a terminal of a source of electrical energy 108, and the other terminal of the source 108 being connected by a conductor 110 to ground 112. Terminal 104b of switch 104 is connected by a conductor 114 to one terminal of bulb 100.

Conduit 44 is connected to the discharge of master cylinder 102. Conduits 48 and 52 are connected to normally closed hydraulic fluid pressure actuated switches 116 and 118 respectively, with conduits 48' and 52' extending from the switches to the brake assemblies (not shown) of the vehicle.

Bulb 100 has an electrical conductor 120 extending therefrom to a junction point 122. Two electrical conductors 124 and 126 extend from junction point 122 to terminals 116a and 118a of switches 116 and 118. The other terminals 116b and 118b of switches 116 and 118 are connected by conductors 128 and 130 to ground 112.

Under normal conditions when the pressure on hydraulic liquid in master cylinder is increased to actuate the brake assemblies, the switch 104 is closed, but no electric circuit is completed to illuminate bulb 100 as the increased pressure on the hydraulic liquid opens switches 116 and 118. However, if there is a serious leak in one of the brake assemblies, or in one of the conduits 48' or 52' leading thereto, there is not sufficient hydraulic liquid pressure to open the switch 116 or 118 associated with the defective brake when the master cylinder is actuated, and an electric circuit is accordingly completed to bulb 100. Completion of the electric circuit to bulb 100 results in the illumination thereof, and warns the driver of the defective brake situation.

I claim:

1. A combined safety device and alarm assembly for use with a pressurized fluid supply line and first and second conduits leading to first and second concurrently operated fluid actuated brake assemblies, said device being of the type that includes a valve body that defines a confined space that is in communication with first and second axially aligned bores and a third bore normally disposed to said first and second bores; a valve body portion that extends into said confined space and has a fourth bore therein that is axially aligned with said first and second bores; first and second plugs mounted in said first and second bores, said first and second plugs having first and second longitudinal bores therein, and the adjacent ends of said plugs defining ring shaped valve seats; an elongate valve member slidably mounted in said fourth longitudinal bore, said valve member having end surfaces that can abut against said valve seats when said valve member moves longitudinally from a first centered position between said plugs to a second position; first and second means for connecting said first and second conduits to said first and second plugs to be in communication with said first and second bores; third means for connecting said fluid supply line to said third bore; fourth means that at all times tend to maintain said valve member in said first position, said safety device being characterized by:

a. radially deformable resilient means so operatively associated with said valve member and plugs that said valve member moves from said first to said second position due to an unbalanced fluid pressure condition arising in said confined space as a result of a leak in one of said first or second conduits or said brake assemblies associated therewith, said resilient means not only seals the longitudinal bore in said first or second plug leading to the defective conduit or brake assembly to prevent any further flow of fluid from said confined space therethrough but locks said second position;

b. first and second normally closed fluid pressure actuated electric switches in communication with said first and second conduits;

c. a third normally open fluid pressure actuated switch in communication with said supply line;

d. electrically operated warning means;

e. a source of electric power; and f. an electric circuit so connecting said first, second and third switches, said warning means and said source of power that said circuit is not completed to said warning means when the pressure on fluid in said supply line is increased and said valve member remains in said first position, but said electric circuit to said warning means being completed when said valve member is held in said second position by said resilient means and one of said first or second fluid pressure actuated electric switches does not assume an open position due to there being a leak in said first or second conduit, and said first or second switch is subjected to no fluid pressure as a result thereof, with said warning means continuing to be energized until said circuit is broken or said valve member is moved to said first position.

2. An assembly as defined in claim 1 in which said radially deformable resilient means includes:

g. two elongate extensions extending outwardly in opposite directions from said end surfaces of said valve member, said extensions having smaller transverse cross sections than those of said bores in said plugs; and h. two resilient rings mounted in fixed positions on said extensions, said rings having external diameters greater than the diameters of said bores in said plugs, with one of said rings being sealingly compressed in one of said bores in said plugs as said valve member moves from said first towards said second position, and said compressed ring expanding to engage a transverse circular groove in one of said plugs when said valve member is in said second position to hold said valve member in a stationary position relative to said housing.

3. An assembly as defined in claim 1 in which said radially deformable means includes:

g. two longitudinally spaced resilient rings mounted in fixed positions on the adjacent ends of said plugs, with one of said rings being radially compressed when said valve member moves from said first to said second position for a grooved cavity in an end of said valve member to engage said ring to effect a seal therewith and to hold said valve member in said second position.

4. An assembly as defined in claim 2 in which said fourth means is a pair of helical springs in said housing that contact said plugs and opposite ends of said valve member.

5. An assembly as defined in claim 3 in which said fourth means is a pair of helical springs in said housing that contact said plugs and opposite ends of said valve member.

6. An assembly as defined in claim 2 in which said fourth means includes a spring-loaded detent supported from said housing that engages a first recess in said valve member when said valve member is in a first position and a second recess in said valve member when said valve member is in said second position.

7. An assembly as defined in claim 3 in which said fourth means includes a spring-loaded detent supported from said housing that engages a first recess in said valve member when said valve member is in a first position and a second recess in said valve member when said valve member is in said second position.

* * * * *